(12) United States Patent
Nakabe et al.

(10) Patent No.: US 7,011,250 B2
(45) Date of Patent: Mar. 14, 2006

(54) IC CARD READER/WRITER, IDENTIFICATION METHOD AND PROGRAM

(75) Inventors: Futoshi Nakabe, Hiroshima (JP); Tadakatsu Masaki, Hiroshima (JP); Shinji Kawano, Hiroshima (JP); Hideo Oozeki, Hiroshima (JP); Hiromi Ebara, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 339 days.

(21) Appl. No.: 10/320,423

(22) Filed: Dec. 17, 2002

(65) Prior Publication Data

US 2003/0116626 A1   Jun. 26, 2003

(30) Foreign Application Priority Data

Dec. 20, 2001   (JP)   .............................. 2001-387774

(51) Int. Cl.
  *G06K 19/00* (2006.01)
  *G08B 13/14* (2006.01)
(52) U.S. Cl. ................. 235/487; 340/572.1; 340/572.4
(58) Field of Classification Search ................ 235/375, 235/492, 451, 487; 342/44; 340/572.1–572.9, 340/5.1–5.7
See application file for complete search history.

(56) References Cited

U.S. PATENT DOCUMENTS

| 5,929,801 A | * | 7/1999 | Aslanidis et al. | ............. 342/44 |
| 6,040,786 A | * | 3/2000 | Fujioka | ..................... 340/928 |
| 6,547,148 B1 | * | 4/2003 | Kelly et al. | ................. 235/492 |

FOREIGN PATENT DOCUMENTS

| EP | 0 924 635 A2 | 6/1999 |
| EP | 1 001 366 A2 | 5/2000 |
| EP | 1 017 005 A2 | 7/2000 |
| JP | 2000-298712 | 10/2000 |
| WO | WO 98/52142 | 11/1998 |

* cited by examiner

*Primary Examiner*—Karl D. Frech
*Assistant Examiner*—Jamara A. Franklin
(74) *Attorney, Agent, or Firm*—McDermott Will & Emery LLP

(57) ABSTRACT

This invention provides a reader/writer, ID method and program comprising a response-detection unit of detecting normal responses and collisions from IC cards in response to a request; and a response-invalidation unit of sending a response-invalidation command, which is a command not to respond to requests in the future, to IC cards that sent normal responses when the response-detection unit received normal responses from IC cards even though collisions were detected.

7 Claims, 18 Drawing Sheets

IC CARD READER/WRITER, IDENTIFICATION METHOD AND PROGRAM

BACKGROUND OF THE INVENTION

1. Field of the Invention

This invention relates to an IC card reader/writer, ID method and program thereof, and more particularly to an IC card reader/writer, ID method and program that identifies an IC card using a time slot.

2. Description of the Related Art

Conventionally, a time slot method has been used in communication between a contactless IC card, which gives and receives data using an electromagnetic induction method, and a reader/writer, which identifies the contactless IC card. This is because when there is a plurality of contactless IC cards inside the communication area of the reader/writer at that same time and the plurality of contactless IC cards respond simultaneously to polling from the reader/writer, the response signals used for the responses collide and it becomes impossible for any of the contactless IC card to communicate properly with the reader/writer.

The time slot communication method is explained below.

(1) First, in order to confirm the existence of the contactless IC card, the IC card reader/writer (hereafter simply called the reader/writer) sends an initial response request command to the contactless IC card. The initial response request command contains a value of the number of time slots that is required to decide a specific time to send back a response for the initial response to the reader/writer, or a value that is required to calculate 'the number of slots'.

(2) After receiving the initial response request command, the contactless IC card sends back the initial response, at a time slot, A time slot used for the response, which is a period between specific times, is decided by the card itself on the basis of the value of the number of time slots and a random numbers.

(3) If it is detected the collision of initial responses that appear when a plurality of contactless IC cards select a same time slot to response, the reader/writer resends an initial response request command.

(4) The reader/writer recognizes all the contactless IC cards by receiving initial responses from all the contactless IC cards without collision, and then the sequence for identifying the contactless IC card is completed.

The following explains in more detail about the above-mentioned processing according to FIG. 16 to FIG. 18. Besides, the following processing is concerned with the contactless IC card adjusted to the international standard ISO/IEC (International Organization For Standardization/International Electrotechnical Commission) 14443 for the proximity contactless IC card.

For instance, ISO/IEC14443 can be applied to a contactless Telephone Card. More specifically, it is a case where the three contactless IC cards 1601, 1602 and 1603 having a function of telephone card are simultaneously put into a reader/writer functioning as a payphone 1600, which is shown as FIG. 16.

The recognition system of the contactless IC card of ISO/IEC14443 executes the recognition of the contactless IC card according to the following procedure.

First, the reader/writer 1600 as the payphone sends an initial response request command. The initial response request command has a format shown in FIG. 18 and notifies the contactless IC card of the number of time slots (N) by means of three bits 1803 composed of bit 1 to bit 3, those bits included in 8 bits of PARAM 1802 composing the initial response command 1801. Besides, APf 1804 is a header indicating the initial response request command, while AFI 1805 indicates an adaptive class of the contactless IC card. And CRC (Cyclic Redundancy Check) 1806 is CRC from APf to PARAM.

Besides the contactless IC card responds at one of N slots of 1 to N, however, the following explanation is made on the basis that the number of time slots (N) is assumed to 4. That is to say, the contactless IC cards 1601 and 1602 select a time slot from 1 to 4 slots, and make the initial response.

In a first card ID process 1701 shown in FIG. 17, first, the reader/writer 1600 sends an initial response request command R1 [REQB] (1702). The contactless IC cards 1601 and 1602 both generate '1' as a random number respectively, and the contactless IC card 1603 generates '2' as a random number for the initial response request command R1 (1702). In this case, the contactless IC cards 1601, 1602 respond using responses [ATQB] A21, A31, respectively, shown in time slot 1 (1703). And the contactless IC card 1603 respond using response [ATQB] A41 shown in time slot 2 (1704). In the above case, both the contactless IC cards 1601, 1602 respond at the same time, so the reader/writer 1600 detects a collision of responses from the contactless IC cards in the time slot 1 (1703). Therefore, since the reader/writer 1600 cannot identify the contactless IC cards 1601, 1602, it restarts the ID process.

Next, in the second ID process 1705, the reader/writer 1600 sends an initial response request command R2 (1706). Here, supposing the contactless IC card 1601 and the contactless IC card 1603 generate '1' as a random number respectively, and the contactless IC card 1602 generates '3' as a random number, contactless IC cards 1601, 1603 respond using packet A22, A42, respectively, shown in time slot 1 (1707). Also, the contactless IC card 1602 responds using packet A32 shown in time slot 3 (1708). In this case, the reader/writer 1600 detects a collision between responses from the contactless IC cards 1601, 1603 in the time slot 1 (1707). Therefore, the reader/writer 1600 cannot identify the contactless IC cards 1601, 1603, so it restarts the ID process.

Next, in the third ID process 1709, the reader/writer 1600 sends an initial response request command R3 (1710). Here, suppose that contactless IC card 1601 generates '1' as a random number, the contactless IC card 1602 generates '3' as a random number and the contactless IC card 1603 generates '4' as a random number. In this case, the contactless IC card 1601 responds using packet A23 shown in time slot 1 (1711), the contactless IC card 1602 responds using packet A33 shown in time slot 3 (1712) and the contactless IC card 1603 responds using packet A43 shown in time slot 4 (1713). Therefore, the reader/writer 1600 does not detect any collisions and so is able to identify all of the contactless IC cards and end the ID process. The process described above is a card ID process for identifying the contactless IC cards according to standard ISO/IEC 14443.

A period after the power has been supplied to the contactless IC cards until all of them are identified by the reader/writer is possible to assign an idling period+ready period On the other hand, when all of the contactless IC cards have been identified, the reader/writer sends an 'ATTRIB' command to each of the contactless IC cards. This indicates that the contactless IC card can shift from the idling period+ready period to the active period, and after the contactless IC card receive the 'ATTRIB' command and have shifted to the active period, various kinds of communications with the reader/writer becomes possible. The contactless IC card that has shifted to the active period do not respond to the initial response request command. Here, when a 'HALT' command is received in the place of the 'ATTRIB' command, the contactless IC card shifts to the halt period, and does not perform communication with the reader/writer. In this case, when the reader/writer sends a 'WAKE-UP' command, the contactless IC card shifts to the active period and communication becomes possible.

Under the ISO/IEC 14443 standard, the period between when the contactless IC card receives the initial response request command and when it responds to the request at the time slot 1 is defined as 302 μsec, and the period of a time slot is as 2266 μsec. The period (μsec), from when the contactless IC card receives the initial request from the reader/writer 1600 to when the card sends the initial response, can be found according to the following equation (Equation 1).

$$\text{Period}(\mu sec) = 302\ \mu sec + 2266\ \mu sec \times (\text{the selected number of slots} - 1) \quad \text{Equation 1}$$

There is the slot maker system as the other similar system to the time slot system. The slot marker system is a method in which, the reader/writer sends an initial response request command using the time slot method, and then sends a slot marker command at the time of the start of each slot, which indicates the start of the slot. Each IC card responds to the time slot specified by the reader/writer, so the aspect of identifying IC cards is essentially the same as in the time slot method.

Furthermore, a technique for avoiding a delay in the ID process of the contactless IC card due to a collision of responses is disclosed in Japanese laid-open publication No. 2000-298712.

In the technique disclosed in Japanese laid-open publication No. 2000-298712, the time slots for which collisions occurred are counted by checking collisions of responses for each time slot and the number of time slots is increased or decreased based on the number of time slots for which collisions occurred.

For the contactless IC card (contactless IC card that conform to international standard ISO/IEC 14443) that uses the aforementioned time slot method, when the contactless IC card responds to the reader/writer, the contactless IC card itself uses a random number and selects the time slot. Therefore, in the case that the random numbers generated by a plurality of the contactless IC cards are the same, the selected time slot becomes the same and the responses always collide. In this case, the reader/writer must send the response request command again and perform the ID process for identifying the contactless IC card, which as a result leads to a delay in identifying the contactless IC card.

Moreover, in the technique disclosed in Japanese laid-open publication No. 2000-298712, by increasing the number of time slots specified by the reader/writer based on the number of time slots for which collisions occurred, the probability that the contactless IC card will select the same time slot decreases. However, in the technique described above, it is necessary to determine whether or not there was a collision of responses for each individual time slot, and then count and store in memory the number of collisions, so the construction of the reader/writer becomes complicated. Also, the number of time slots is changed (increased) and the ID process starts, and when the number of collisions decreases even though the number of contactless IC cards is not changed, the next time, the number of time slots is decreased and the ID process is performed, so there is a problem in that the frequency of collisions increases again and the time required for the ID process becomes longer.

The above-mentioned problem, that it takes a lot of time to complete the recognition, appears remarkably in the system such as a ticket examining machine at a wicket, wherein the user has to let the reader/writer recognize the contactless IC card without stopping. That is to say, if the recognition of the contactless IC card is delayed, the use has to stop and it becomes an obstacle in the utilization of the system.

Moreover, in the future it is expected that various systems that take advantage of the convenience of the contactless IC card will be developed in various different fields. In other words, in time, it is expected that the number of the contactless IC cards possessed by a single user (for example carried in a user's wallet) will increase. Under these circumstances, the time required for performing the ID process will become even longer and the problem of delay will become even worse. Therefore, from the aspect of increasing the number of years of service that a system can be used, it is necessary to prepare for this kind of situation beforehand.

On the other hand, if it is possible to recognize the contactless IC card speedier than ever, the system will be able to be applied to a speedier mobile device. For this purpose, it has been expected to improve the speed-up of the recognition and the processing.

SUMMARY OF THE INVENTION

In order to accomplish the object described above, this invention uses the unit described below. In other words, this invention assumes a reader/writer for IC cards that is capable of communicating with a plurality of IC cards. Here, a response-detection unit detects normal responses from IC cards to requests, as well as collisions of responses, and when the response-detection unit receives normal responses from the IC cards even though collisions are detected, a response-invalidation unit sends a response-invalidation command, which is a command not to respond to future requests, to the IC cards that sent a normal response.

Therefore, future requests are sent only to IC cards that sent request caused collisions, or in other words, in future ID processing, the probability of having collisions is decreased, and thus it is possible to finish the ID process more quickly.

There is a slot-number-increase unit that increases the number of time slots for the next request based solely on whether or not the response-detection unit detected collisions, and furthermore, the slot-number-increase unit increases the number of time slots based on whether or not the response-invalidation unit sends a response-invalidation command, or in other words, based on whether or not the response has been made invalid.

With this construction, by performing a response-invalidation process each time for IC cards that correspond to non-collisions, the ID process is performed only for IC cards having collisions, and since the number of suitable time slots is increased, it is possible to perform ID more smoothly and efficiently according to the number of IC cards, even in systems where it is necessary to identify many IC cards.

The response-invalidation command can be an 'ATTRIB' command or 'HALT' command based on the ISO/ICEC 14443 standard.

In addition, the reader/writer can also be such that a collision-detection unit detects collisions of responses from IC cards responding to a request, and the slot-increase unit increases the number of time slots based only on whether or not there is a collision detected by the collision-detection unit.

This reader/writer detects only whether or not there are collisions of responses from IC cards and increases the number of time slots based only on whether or not there are collisions, so it is possible to efficiently perform identification according to the number of IC cards without having to add complex construction to the reader/writer.

In this construction, the number of time slots included in the first (first time) request can be '1'.

Moreover, the reader/writer can be such that it comprises a memory unit that stores in memory the number of IC cards of a plurality of IC cards that are recognized to be normal, a calculation unit that calculates the number of time slots (initial value) to be included in the first request for identifying each IC card based on the number of IC cards stored by the memory unit, and a slot-number-reset unit that sets the number of time slots calculated by the calculation unit as the number of slots for the first request.

In the case of this reader/writer, it is possible to dynamically change the number of time slots based on the past log of identified IC cards, thus making it possible to efficiently reduce the ID processing time for each card. Also, at the same time, it becomes possible to increase the number of years of service that a system using this reader/writer can be used.

The reader/writer can be embodied using a computer. In this case, the response-detection unit, response-invalidation unit, slot-number-increase unit and collision-detection unit can be embodied by running a program on a computer.

The object of this invention is to provide an IC card reader/writer, ID method and program that are capable of quickly completing the process of identifying contactless IC card.

DESCRIPTION OF THE PREFERRED EMBODIMENTS

In order for a better understanding of the invention, the preferred embodiments of the invention will be explained below with reference to the drawings. The embodiments of the invention described below are examples of the invention and do not limit the technical range of the invention.

(Embodiment 1)

Figure 1:
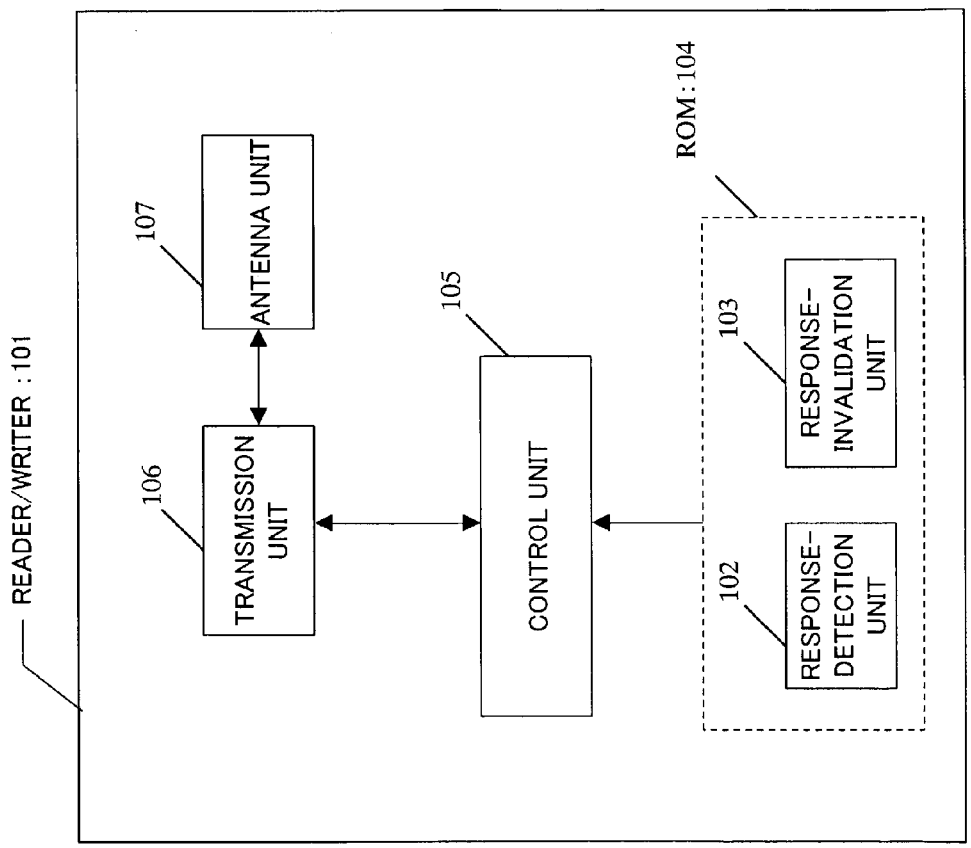
FIG. 1 is a functional block diagram of the reader/writer in a first embodiment.
Figure 2:
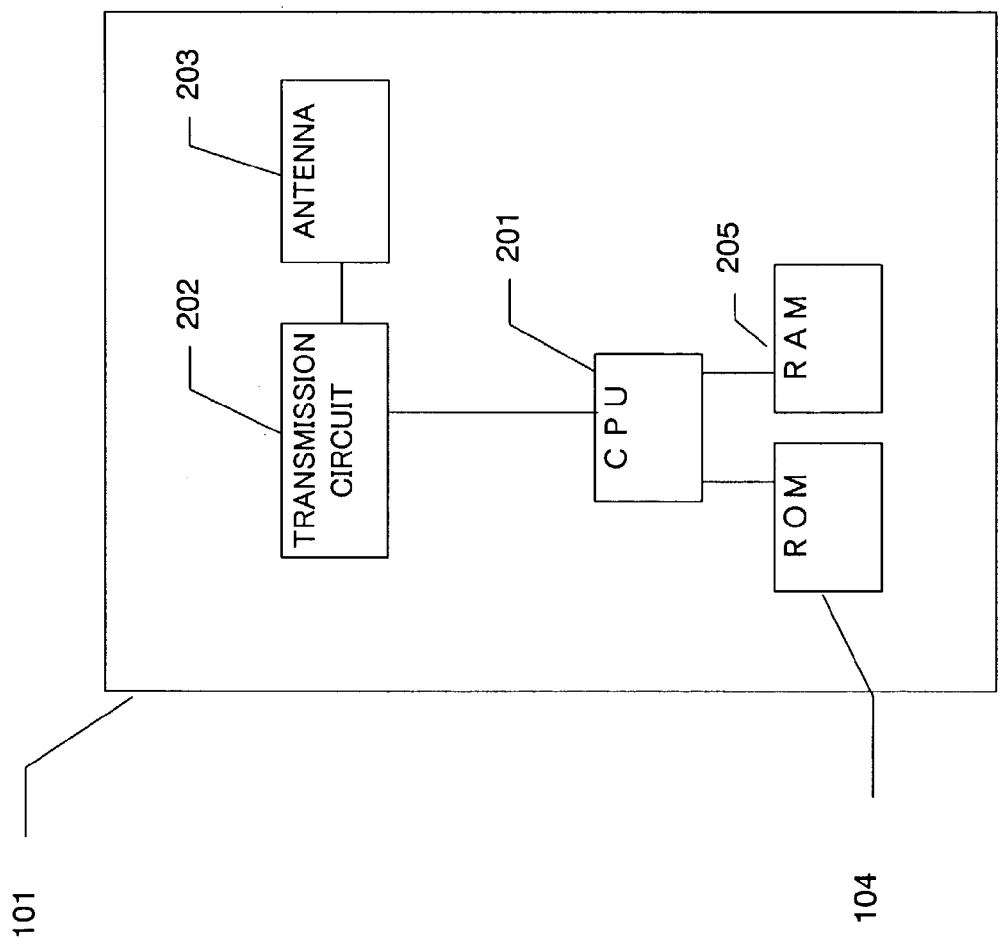
FIG. 2 is a drawing showing the configuration of hardware of the reader/writer in a first embodiment.

First, the reader/writer of a first embodiment of the invention will be explained. FIG. 1 is a functional block diagram of the reader/writer 101 in this first embodiment. In addition, FIG. 2 is a drawing showing the configuration of the hardware of the reader/writer 101.

The reader/writer 101 comprises an antenna 203, transmission circuit 202, CPU 201, ROM (Read Only Memory) 104 in which a program for controlling the reader/writer is stored, and RAM (Random Access Memory) 205 that is used as a work area when executing the program.

When the contactless IC card that communicates with the reader/writer 101 enters the area where it is possible to communicate with the reader/writer 101, it is operated by power induced by an electromagnetic wave from the reader/writer.

As shown in FIG. 1, when the reader/writer 101 is expressed according to function, it comprises an antenna unit 107, a transmission unit 106, a control unit 105, a response-detection unit 102 and a response-invalidation unit 103. The process of each unit will be explained in detail.

The response-detection unit 102 and response-invalidation unit 103 are stored as a program in ROM 104, for example, and when needed they are read and executed by the CPU 201.

Figure 3:
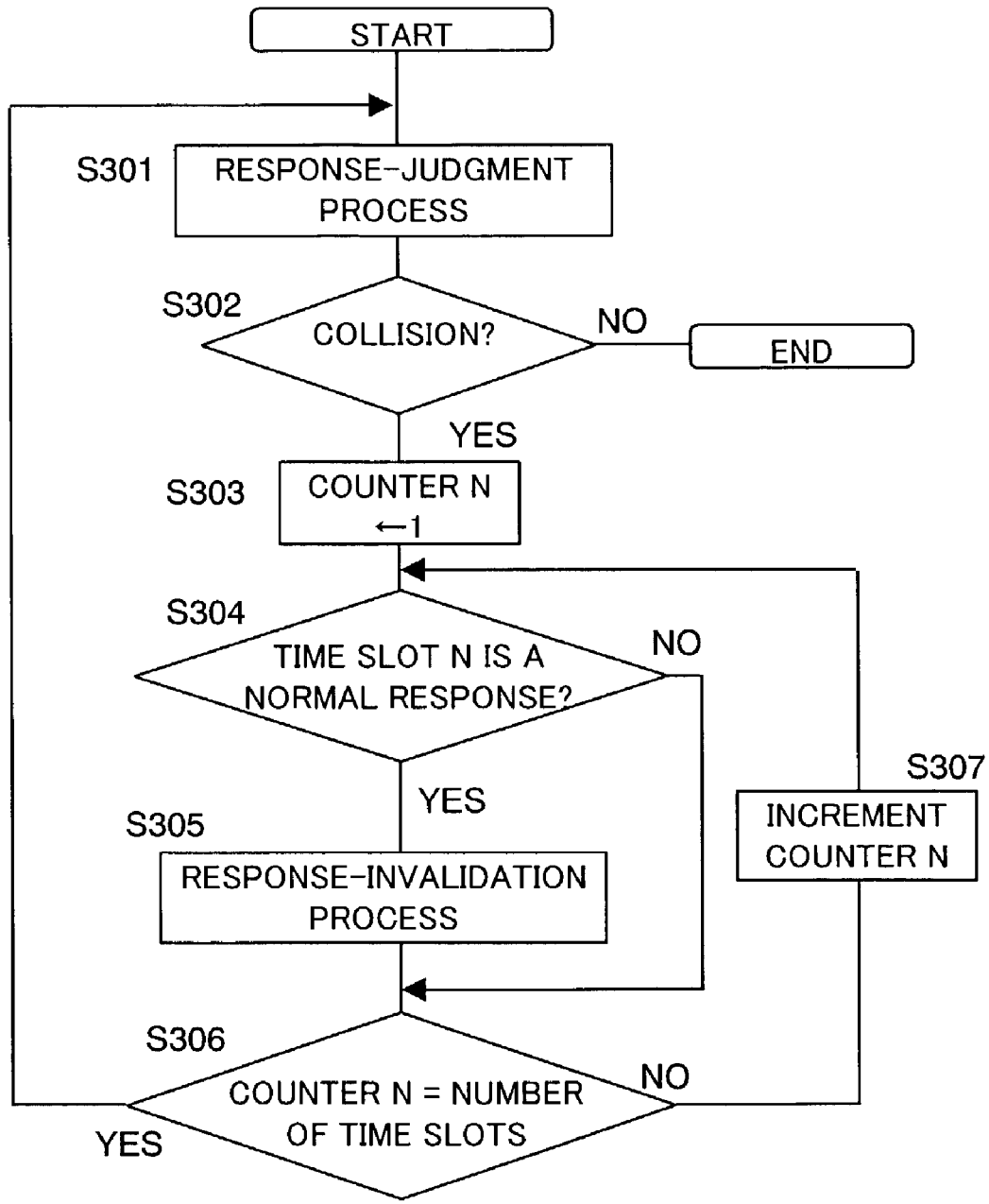
FIG. 3 is a flowchart of the processes executed by the reader/writer in a first embodiment.
Figure 4:
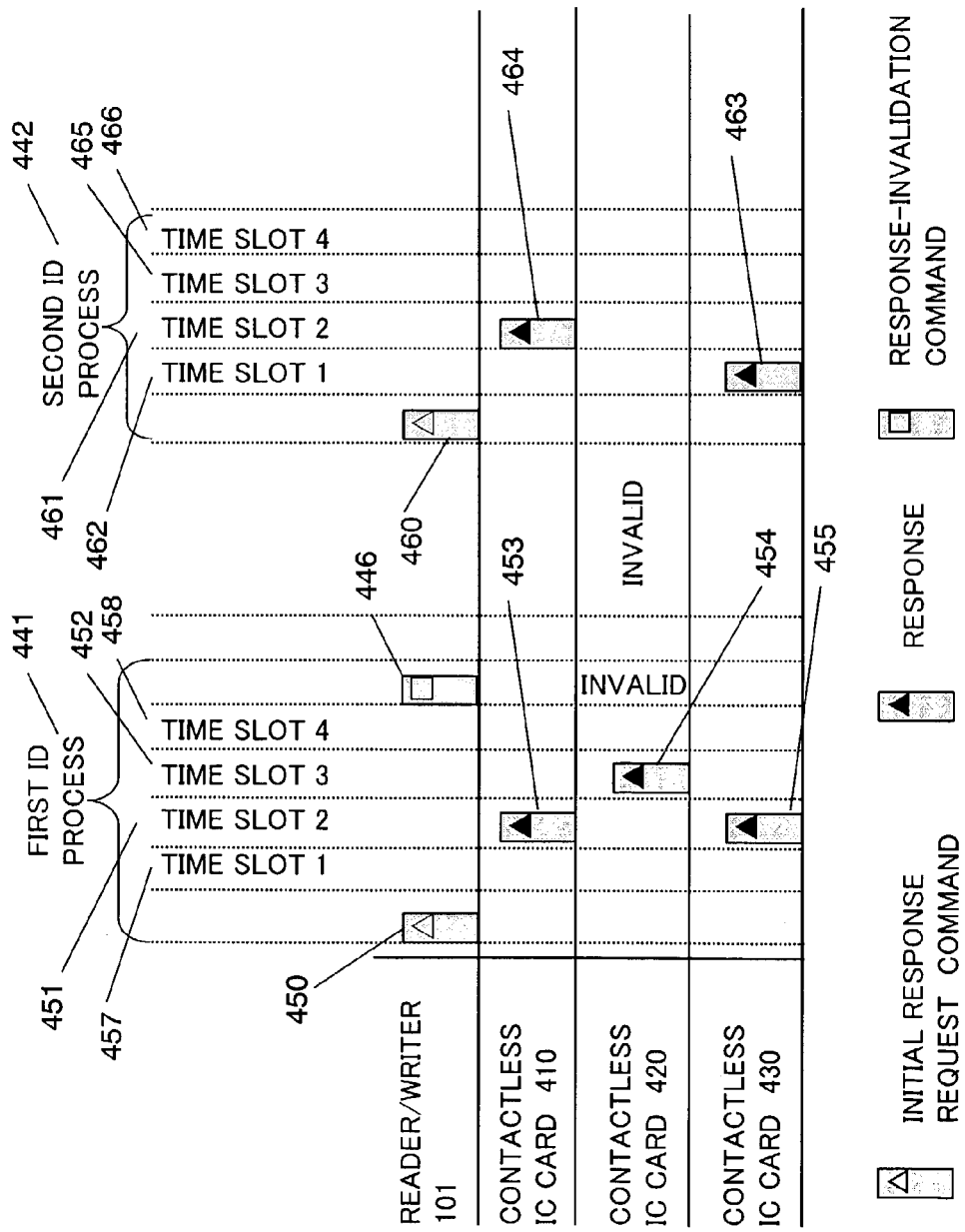
FIG. 4 is a drawing showing an image of the ID process in a first embodiment.
Figure 5:
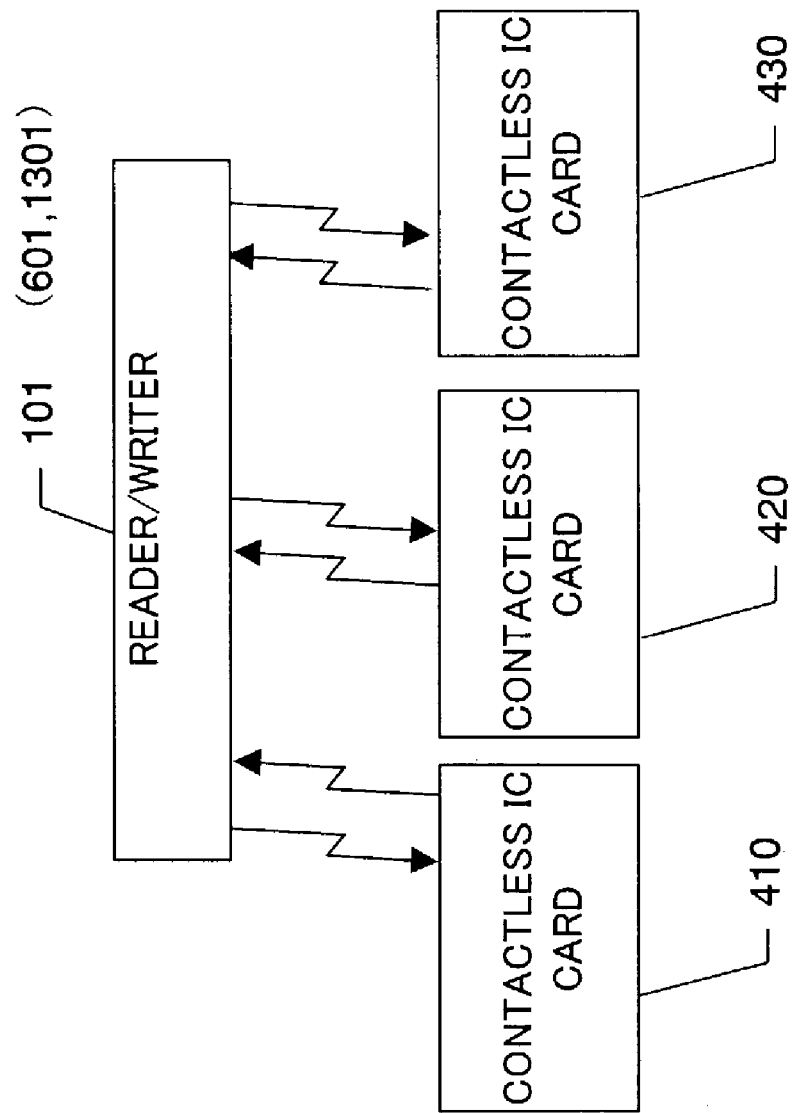
FIG. 5 is a drawing showing an image of communication between the reader/writer and contactless IC cards.

Next, the processes of the reader/writer in this first embodiment will be explained using FIG. 1, FIG. 3, FIG. 4 and FIG. 5. Here, FIG. 3 is a flowchart of the processes executed by the reader/writer 101. In order for a better understanding, in this first embodiment, contactless IC cards 410, 420, 430 communicate with the reader/writer 101 as shown in FIG. 5.

Figure 18:
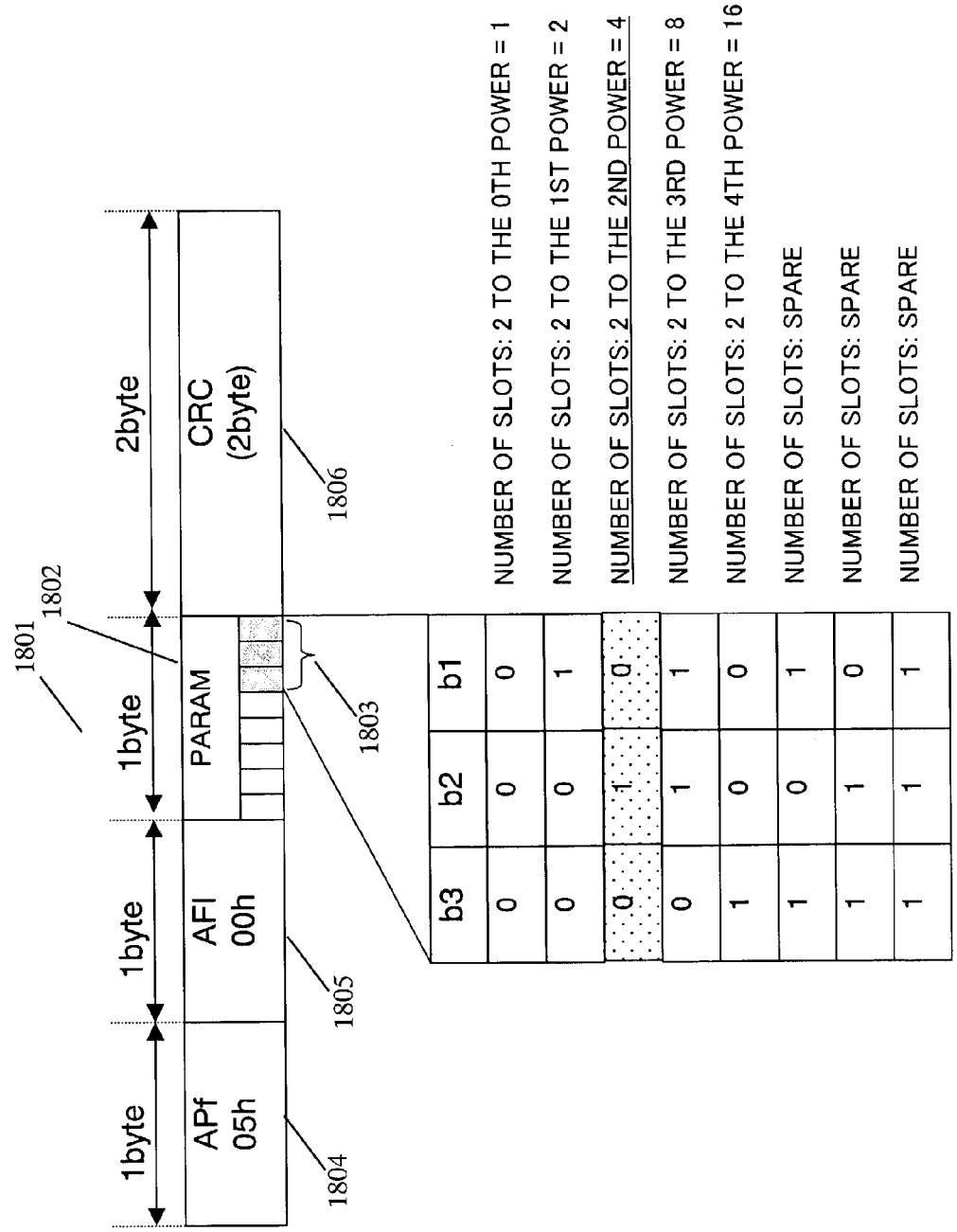
FIG. 18 is drawing showing the format of the initial response request packet.

First, the control unit 105 of the reader/writer 101 sends an initial response request command 450 to the contactless IC cards at specified time intervals (FIG. 3: S301). The initial response request command is sent, for example, at intervals of tens of milliseconds. Here, when the contactless IC cards 410, 420, 430 receive the initial response request command that is sent by the reader/writer 101, each contactless IC card acquires the number of time slots included in the initial response request command. The number of time slots are specified by three bits 1803, Bit 1 to Bit 3, of PARAM shown in FIG. 18, and 2 taken to the power specified by this bit becomes the number of time slots.

Next, the contactless IC cards 410 to 430 select one time slot from among the number of time slots given from the reader/writer 101 and sets that time slot to be used for the response.

Next, the contactless IC cards wait until their respective time slots for sending their responses to the reader/writer, and then at their selected time slot send a response to the initial response request command.

The responses sent from the contactless IC cards are received by the control unit 105 of the reader/writer 101 by way of the antenna unit 107 and transmission unit 106. Here, it is assumed that the contactless IC card 410 selects the time slot 2 (451), the contactless IC card 420 selects the time slot 3 (452) and the contactless IC card 430 selects the time slot 2 (451).

Under the above assumption, the control unit 105 does not receive any response at the time slot 1 (457), so notifies the response-detection unit 102 of that. Next, the control unit 105 receives the responses 453, 455 from the contactless IC cards 410, 430 that were sent using the time slot 2 (451), and sends the received responses to the response-detection unit 102. Also, the control unit 105 receives the response 454 from the contactless IC card 420 that was sent using the time slot 3 (452), and sends the received response to the response-detection unit 102. Furthermore, the control unit 105 does not receive any response for the time slot 4 (458) and notifies the response-detection unit 102 of that (FIG. 3: S301).

As described above, the response-detection unit 102 receives responses corresponding to each time slot, then stores the responses corresponding to each time slot in specified memory unit corresponding to each time slot, and detects (determines) whether or not each response is a 'normal response' or a 'collision'.

The process described above from sending of the initial response request command until determining that there are collisions is taken to be the response-judgment process shown as step S301 in FIG. 3.

Here, no responses corresponding to the time slot 1 (457) or the time slot 4 (458) were detected, and for the time slot 2 (451) there are responses from the contactless IC card 410 and the contactless IC card 430, so they are detected as being a collision. For the time slot 3 (452), there is only a response from contactless IC card 420, so it is detected as being a 'normal' response.

Next, when the response-detection unit detects collision, the response-invalidation unit 103 of the reader/writer 101 sets the counter in the response-invalidation unit 103 to '1' for example (FIG. 3: S302 YES->S303).

When the response-detection unit 102 does not detect the collision, it indicates that there is either no contactless IC card in the range where communication with the reader/writer 101 is possible, or that the responses from each of the contactless IC cards were received with no problem, and processing by the response-detection unit 102 ends (FIG. 3: S302 NO->End). When all of the responses are received, the communication process is performed for each by the control unit 105.

When the response-invalidation unit 103 sets the counter to '1', it searches in the specified memory unit that corresponds to the time slot N (where N is equal to the counter value) indicated by the counter, and determines whether a 'normal' responses is stored.

Here, there is no response stored in the memory unit corresponding to the time slot 1 (457), so then the response-invalidation unit 103 checks whether the number of time slots sent in the initial response request command matches the counter value (FIG. 3: S304 NO->S306).

Next, in the case that the number of time slots sent does not match the counter value, the counter value is incremented by 1, and then the response-invalidation unit 103 determines again whether a 'normal' response is stored in the memory unit corresponding to the time slot 2 (451) indicated by the counter (FIG. 3: S304->S306 NO->S307->S304).

When the above process is repeated, under the above assumption, a normal response is stored in the memory unit corresponding to the time slot 3 (452). In this case, the response-invalidation unit 103 performs the response-invalidation process (FIG. 3: S304 YES (N=3)->S305).

The response-invalidation process is performed as described below. That is, the response-invalidation unit 103 acquires unique information about the contactless IC card 420 by reading the response contents from the memory unit corresponding to the time slot 3 (452). Next, the response-invalidation unit 103 sends a response-invalidation command 446 that contains the unique information to the contactless IC card 420 by way of the control unit 105, transmission unit 106 and antenna unit 107.

Here, the response-invalidation command is a command indicating not to respond to future initial response request command sent from the reader/writer 101 until a command ending communication with the reader/writer 101 is received. This can be the 'ATTRIB' command or 'HALT' command according the ISO/IEC 14443 standard, or can be a command that is newly defined in the design of the reader/writer and contactless IC card.

The contactless IC card 420 that received the response-invalidation command does not respond to future initial response request command until it receives a command indicating the end of communication with the reader/writer 101, however it does perform communication other than the initial response request command, or in other words it shifts to the active period. When the 'HALT' command is received, it shifts to the halt period and does not perform normal communication until it receives a 'WAKE-UP' command.

In step S306 in FIG. 3, when the received number of time slots matches the counter value, the control unit 105 has judged all of the responses and repeats the response-judgment process again (FIG. 3: S306 YES->S301).

Next, the reader/writer 101 that has invalidated the contactless IC card 420 performs the ID process 442 a second time. This second ID process 442 is performed nearly the same as the first ID process 441, however, since the contactless IC card 420 is already invalidated, in the second ID process, only the contactless IC card 410 and the contactless IC card 430 need to be identified.

In other words, the reader/writer 101 sends an initial response request command 460. The initial response request command is received by the contactless IC cards 410 to 430, however, since the contactless IC card 420 is invalidated, it does not respond.

Here, it is assumed that in response to the initial response request command, the contactless IC card 410 selects the time slot 2 (461) and the contactless IC card 430 selects the time slot 1 (462).

Under the above assumption, the control unit 105 receives the response 463 from the contactless IC card 430 that was sent at the time slot 1 (462), and sends the received response to the response-detection unit 102. Also, the control unit 105 receives response 464 from the contactless IC card 410 that was sent at the time slot 2 (461), and sends the received response to the response-detection unit 102. The control unit also notifies the response-detection unit 102 that no responses were received for the time slot 3 (465) and the time slot 4 (466).

In other words, under the above assumption, the response-detection unit 102 does not detect collisions, so the reader/ writer 101 can identify the contactless IC cards 410, 430 as was done conventionally. After that, the contactless IC cards 410, 420, 430 that were identified by the reader/writer 101 can communicate with the reader/writer 101.

When a normal response is received as described above, even though collisions are detected, a response-invalidation command is sent to the IC card that sent the normal response, so future ID processing is only performed for the IC cards that sent responses cause of collision. In other words, in future ID processing, the probability of there being collisions is decreased, so it is possible to complete the ID process more quickly.

Instead of contactless IC cards, it is also possible to apply this invention to a reader/writer that uses contact-type IC cards. Also, instead of using the time slot method, it is possible to use a slot-marker method for the reader/writer being used, or it is also possible to apply the invention to a reader/writer that uses other slot methods.

Moreover, by including a plurality of items of unique information for the contactless IC card in the invalidation command, it is possible to invalidate a plurality of the contactless IC cards, which sent normal responses, simultaneously using one invalidation command.

(Embodiment 2)

Next, the reader/writer 601 of a second embodiment of the invention will be explained with reference to FIG. 6, FIG. 7 and FIG. 8.

Figure 6:
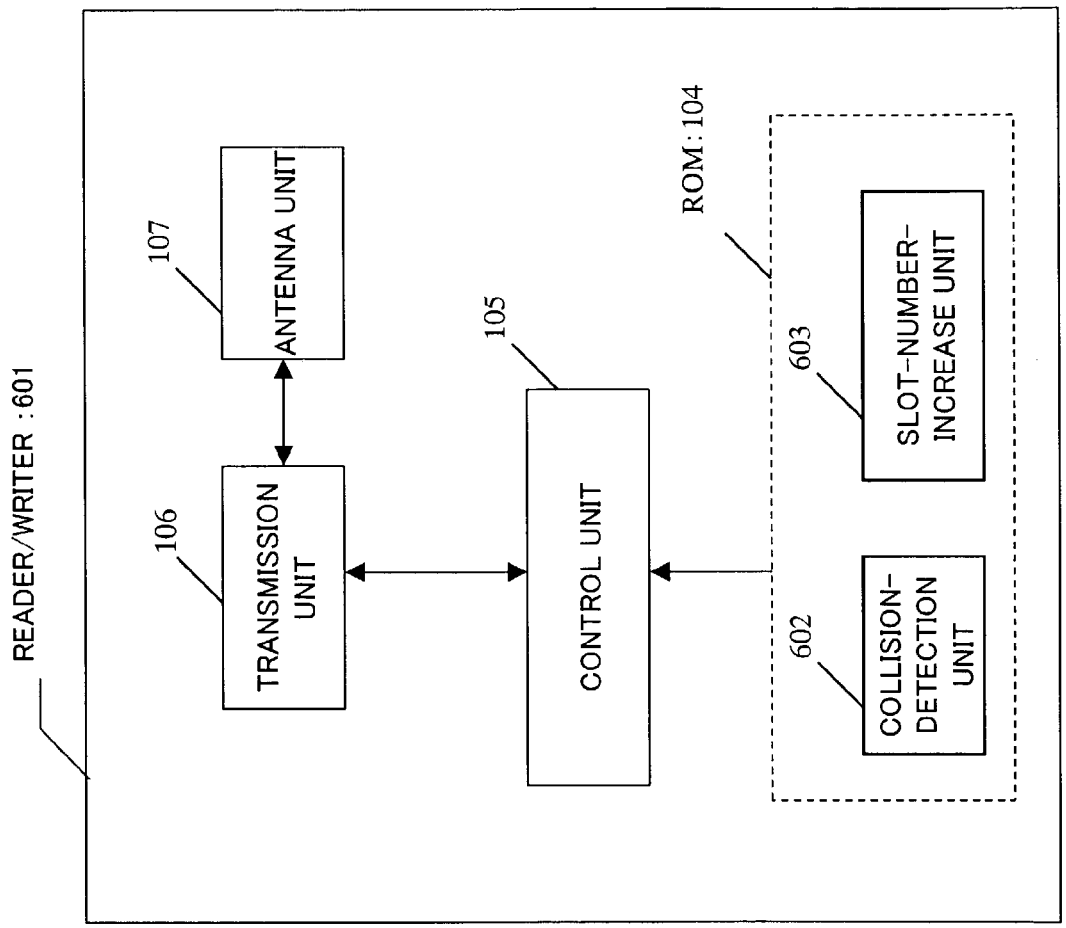
FIG. 6 is a functional block diagram of a reader/writer in a second embodiment.

The reader/writer 601 shown in FIG. 6 is the same as the reader/writer 101 of the first embodiment, however, instead of the response-detection unit 102 and response-invalidation unit 103, it comprises a collision-detection unit 602 and slot-number-increase unit 603. Each unit will be explained in detail below. Here, FIG. 7 is a flowchart of the processes executed by the reader/writer 601 of this second embodiment.

First, for a better understanding, an example will be given using the conditions shown in FIG. 5. In other words, the reader/writer 601 executes an ID process for identifying three different contactless IC cards 410, 420, 430.

Figure 7:
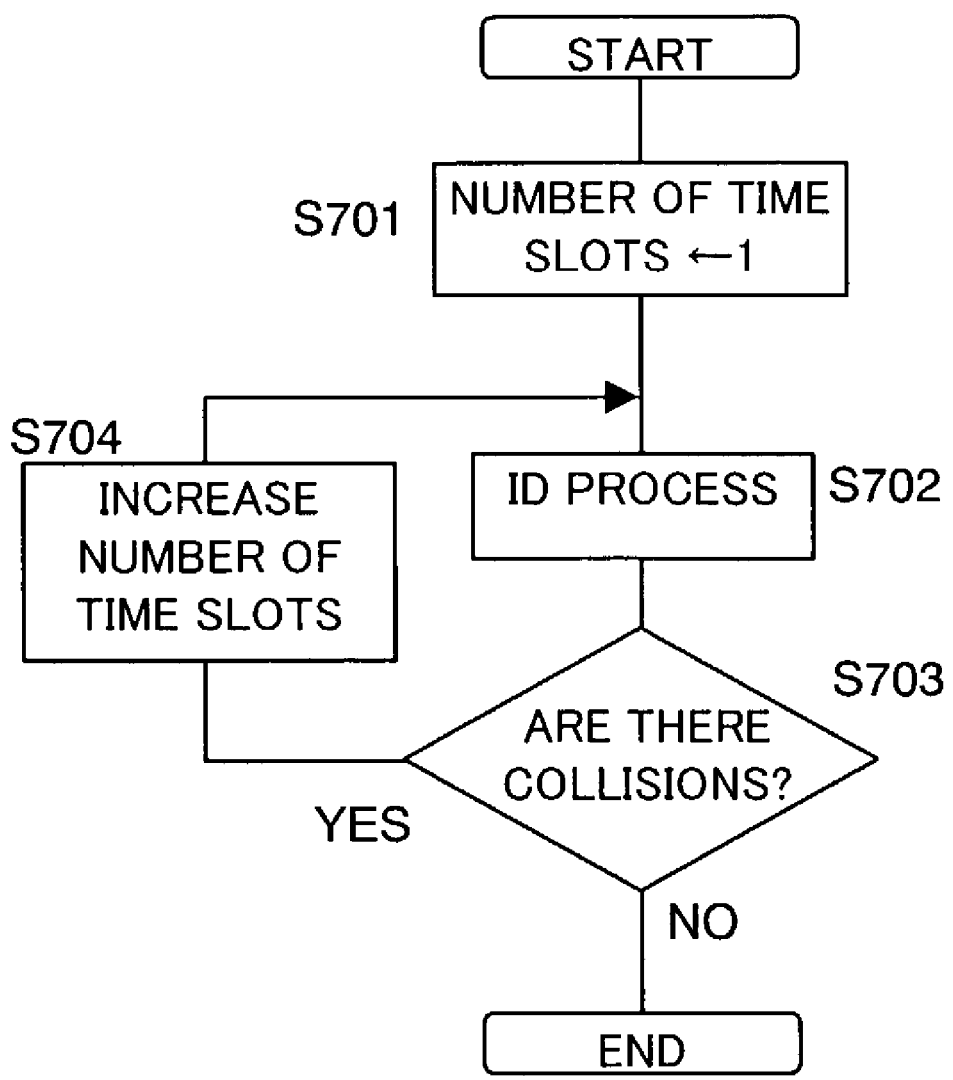
FIG. 7 is a flowchart of the processes executed by the reader/writer in a second embodiment.
Figure 8:
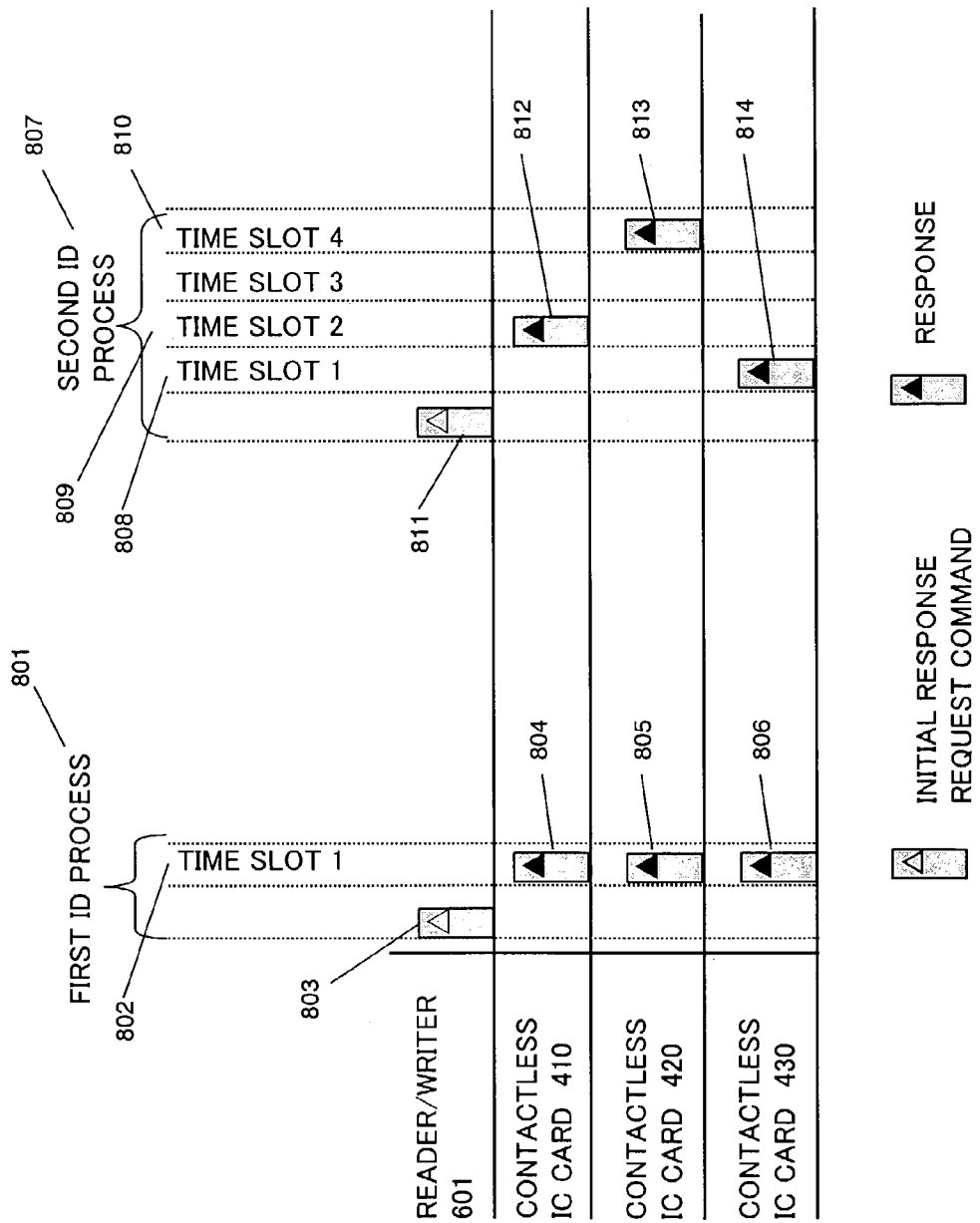
FIG. 8 is a drawing showing an image of the ID process in a second embodiment.

First, the control unit 105 of the reader/writer 601 sends an initial response request command, and the number of time slots for the initial response request command is set to '1' (FIG. 7: S701).

This is because when the reader/writer is communicating with the plurality of contactless IC cards, for example, in the first contactless IC card ID process, the number of contactless IC cards is not known, so it is first assumed that there is only one contactless IC card that can communicate and the number of time slots is set to '1'. By doing this, when communicating with the plurality of contactless IC cards, there is always a collision in the first ID process, however, since the number of time slots is only one, processing of the first initial response request command ends in a short time. Therefore, in the case of a reader/writer that mainly communicates with only one contactless IC card, by setting the number of time slots in the first ID process to '1', it is possible to end the ID process quickly.

After the control unit 105 sets the number of time slots to '1', it performs the ID process for identifying the contactless IC card (FIG. 7: S702). In other words, as shown in FIG. 8, the reader/writer 601 sends the initial response request command 803 in the first ID process 801. Since the number of time slots set for the initial response request command is '1', the contactless IC cards 410, 420, 430 can only select time slot 1 (802) for their respective responses. That is, the response 804 from the contactless IC card 410, the response 805 from the contactless IC card 420 and the response 806 from the contactless IC card 430 are each sent using the time slot 1 (802).

The responses 804 to 806 are received by the control unit 105 by way of the antenna unit 107 and transmission unit 106 of the reader/writer 601. Next, the control unit 105 sends the responses 804 to 806 corresponding to the time slot 1 to the collision-detection unit 602. The collision-detection unit 602 determines from the contents of the responses corresponding to the time slot 1 whether or not there are any collisions of the responses corresponding to the time slot 1.

Here, the responses corresponding to the time slot 1 include responses 804 to 806, so they are detected as being a collision (FIG. 7: S703 YES).

When the collision-detection unit 603 detects the collision, it notifies the slot-number-increase unit 603, and in order to increase the number of time slots for the next initial response request command, the slot-number-increase unit 603 sets the number of time slots to a value greater than '1', or in other words increases the number of time slots (FIG. 7: S704). Here the number of time slots is set to '4'.

After the slot-number-increase unit 603 sets the number of time slots to '4', the control unit 105 sends an initial response request command 811 again for the second ID process 807 (FIG. 7: S702).

Here, it is supposed for example that the contactless IC card 410 selects the time slot 2 (809) for sending its response 812, the contactless IC card 420 selects the time slot 4 (810) for sending its response 813, and the contactless IC card 430 selects time slot 1 (808) for sending its response 814.

After the responses 812 to 814 are received by the control unit 105 in order corresponding to the time slots 1 to 4, or in other words, in the order response 814, response 812 and response 813, the control unit 105 sends the responses to the collision-detection unit 602.

Here, the collision-detection unit 602 does not detect any collisions, so it does not increase the number of time slots (FIG. 7: S703 NO->END). Naturally, each of the responses 812 to 814 are identified by the reader/writer as normal responses, so it is now possible for each of the contactless IC cards 410 to 430 to communicate with the reader/writer 601.

As described above, the reader/writer detects only whether or not there are collisions of responses from the IC cards and increases the number of time slots based only on whether or not there are collisions, so it is possible to perform the ID process efficiently according to the number of IC cards without having to add complex construction to the reader/writer.

The invention can also be applied to a reader/writer that uses contact-type IC cards instead of the contactless IC cards. Also, the invention can be applied to a reader/writer that uses a slot-marker method instead of the time slot method, and can also be applied to a reader/writer that uses another slot method.

Moreover, the number of time slots can be increased by a fixed value, or by a variable value.

Furthermore, in the case of a reader/writer that predicts communication with a plurality of IC cards from the start, the number of time slots for the first initial response request command does not have to be set to '1', and the number of time slots can be set according to the reader/writer.

(Embodiment 3)

Next, the reader/writer 901 of a third embodiment of the invention will be explained with reference to FIG. 9, FIG. 10, FIG. 11 and FIG. 12.

Figure 9:
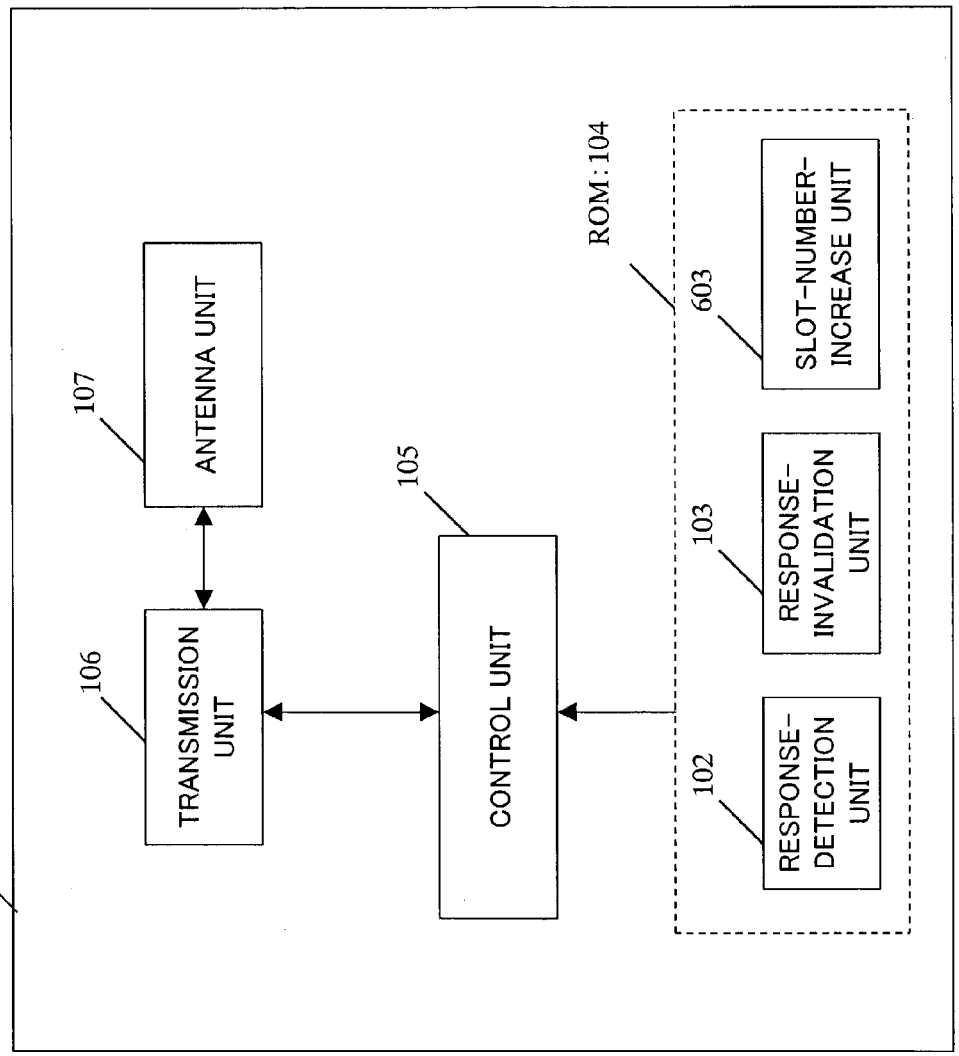
FIG. 9 is a functional block diagram of a reader/writer in a third embodiment.
Figure 10:
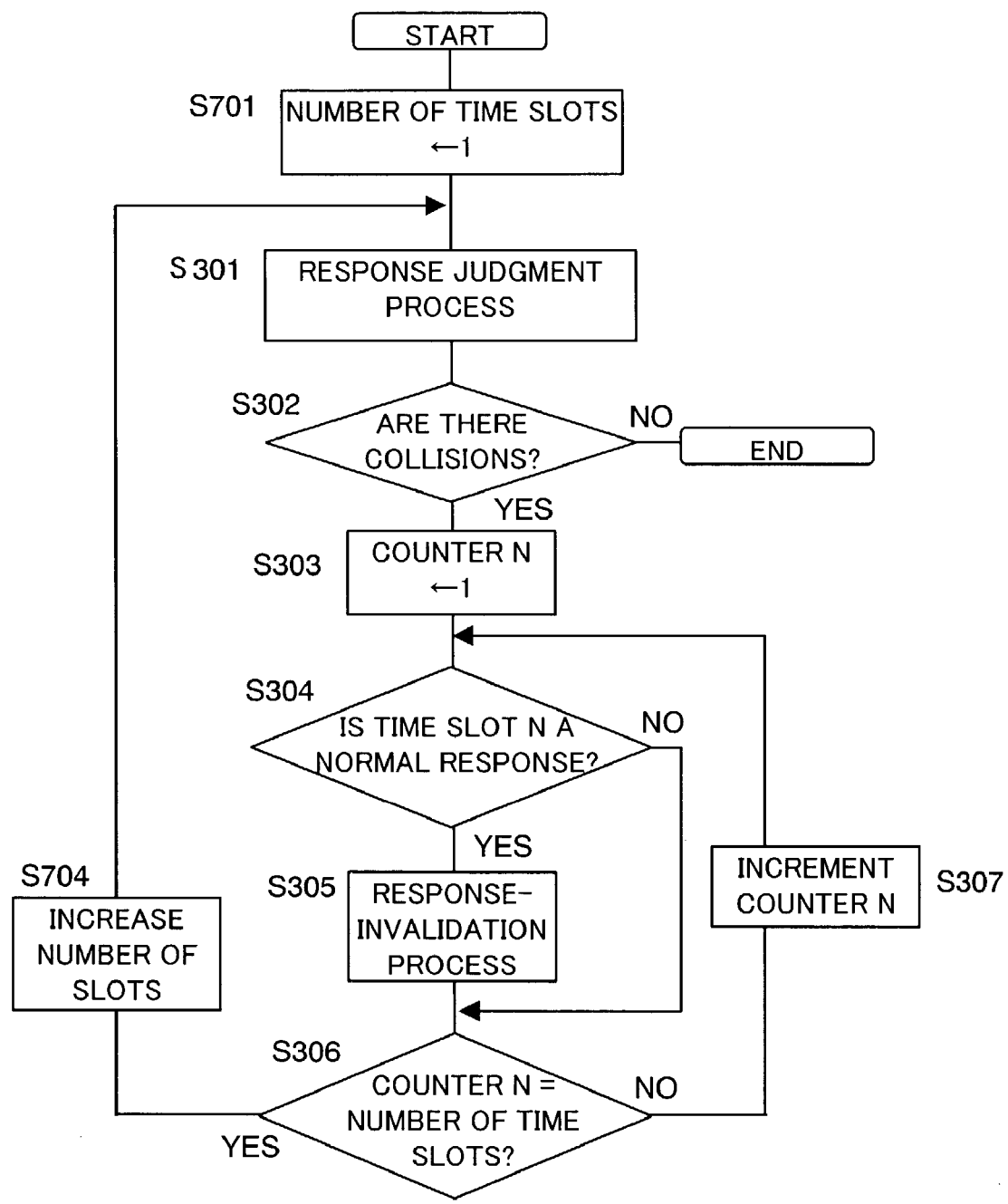
FIG. 10 is a flowchart of the processes executed by the reader/writer in a third embodiment.
Figure 11:
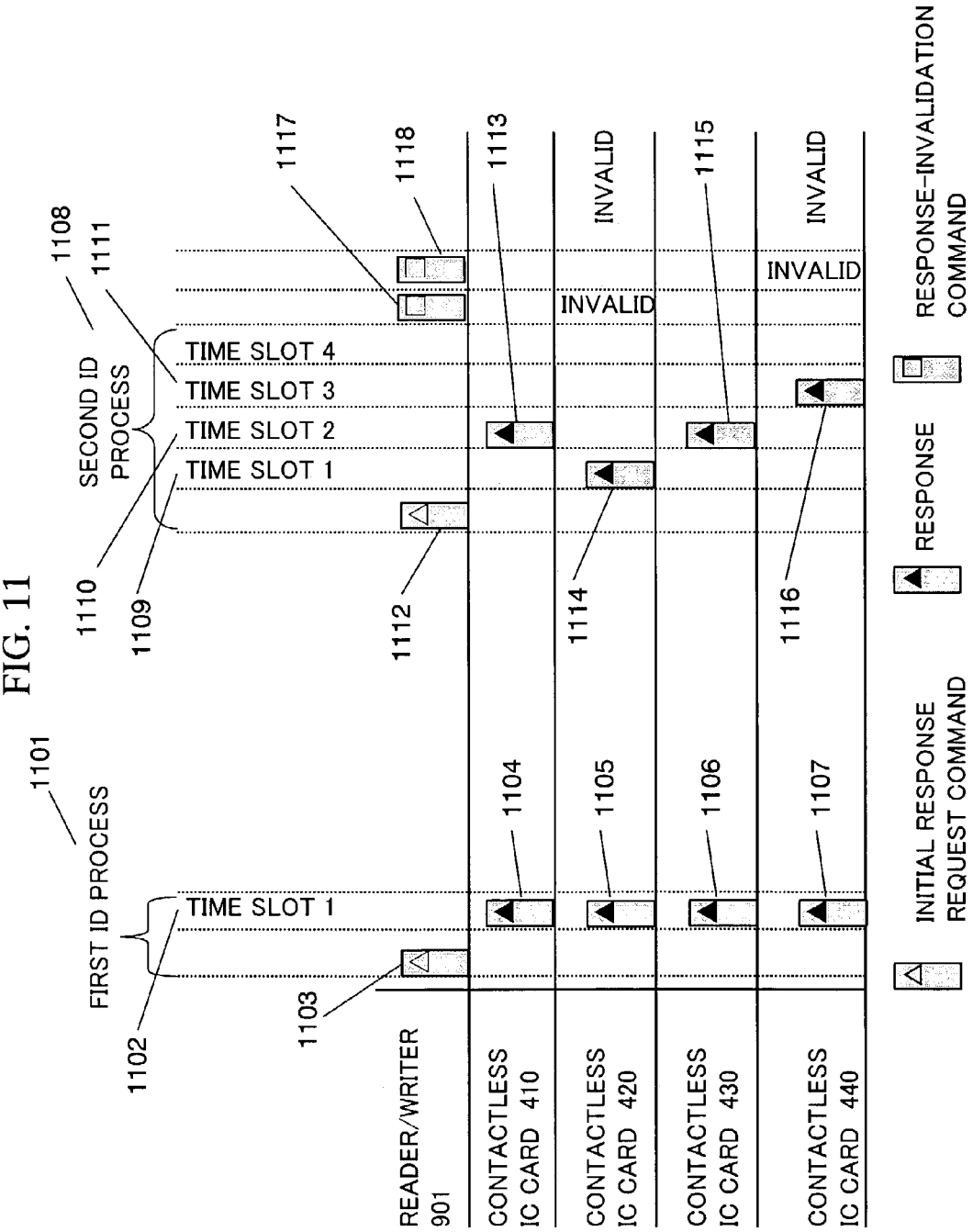
FIG. 11 is a drawing of a first image of the ID process in a third embodiment.
Figure 12:
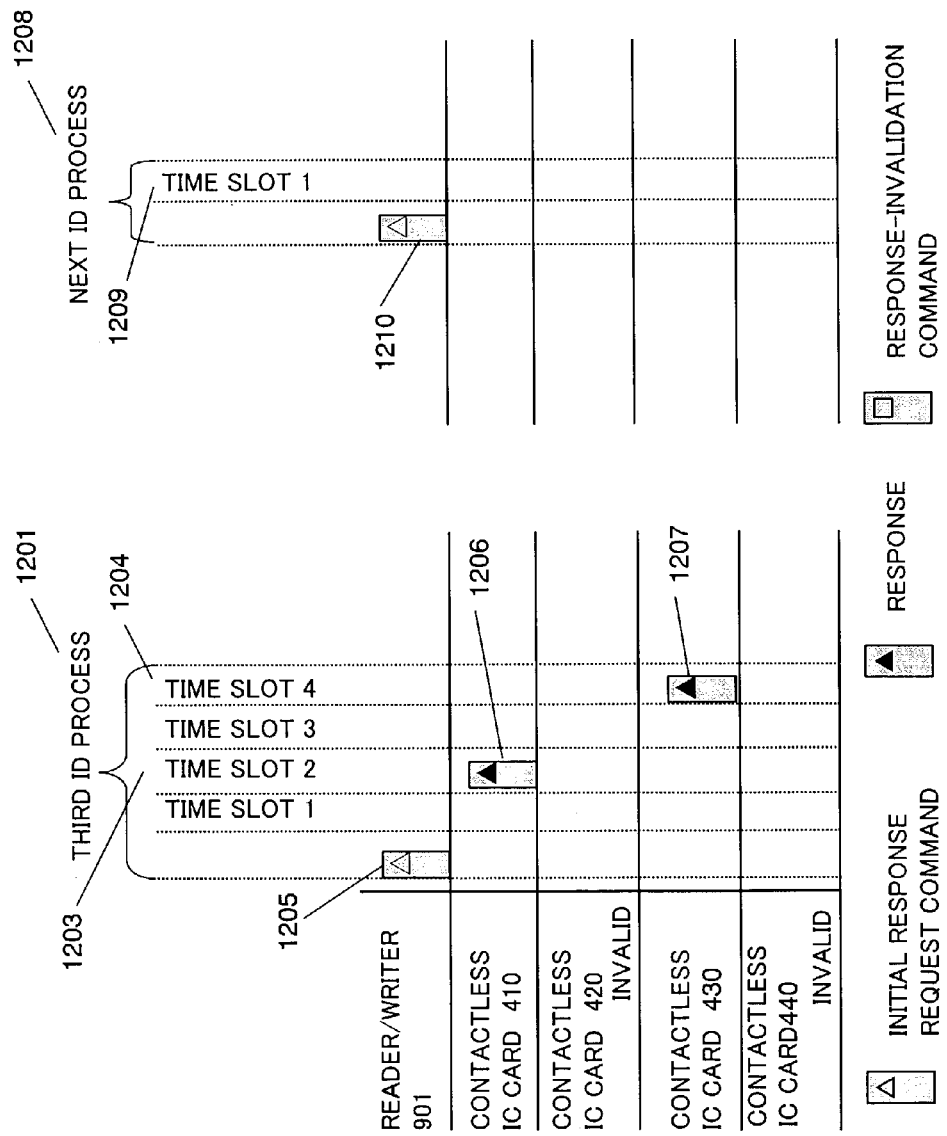
FIG. 12 is a drawing of a second image of the ID process in a third embodiment.

The reader/writer 901 shown in FIG. 9 has the same construction as the reader/writer 101 of the first embodiment and the reader/writer 601 of the second embodiment; however, the function of the collision-detection unit 602 in the second embodiment is included in the response-detection unit 102. In other words, the reader/writer 901 comprises the response-detection unit 102, the response-invalidation unit 103, and the slot-number-increase unit 603. Here, FIG. 10 is a flowchart of the processes executed by the reader/writer 901 of third embodiment. The same code numbers will be used for processes that are the same as those in the first and second embodiments.

In this third embodiment, in addition to the conditions shown in FIG. 5, it is assumed that there is the one more contactless IC card 440. First, when the reader/writer 901 communicates with the contactless IC cards 410, 420, 430, 440, the control unit 105 sets the number of time slots for the initial response request command 1103 used in the first ID process 1101 to '1' (FIG. 10: S701).

Then, after the control unit 105 sends the initial response request command 1103, each of the contactless IC cards 410 to 440 responds to the initial response request command (FIG. 10: S702). Here, since the number of time slots is set to '1', the respective responses 1104 to 1107 from each of the contactless IC cards are sent at the time of time slot 1 (1102). Therefore, the response-detection unit 102 of the reader/writer 901 detects that the responses, which are stored in a specified memory unit and which correspond to the time slot 1 (1102), is a collision (FIG. 10: S302 YES).

When the response-detection unit 102 does not detect a collision, it indicates that there is either no contactless IC card in the communication area where it can communicate with the reader/writer 901, or responses were received from each of the contactless IC cards with no problem, and processing of the response-detection unit ends (FIG. 10: S302 NO->END). Also, when the responses are received, the respective communication is then performed by the control unit 105.

Next, when the response-detection unit 102 detects a 'collision', the response-invalidation unit 103 of the reader/writer 901 sets the counter in the response-invalidation unit 103 to '1' (FIG. 10: S302 YES->S303).

Next, after the response-invalidation unit 103 sets the counter to '1', it references the specified memory unit corresponding to the time slot N (where N is equal to the counter value) indicated by the counter to determine whether the stored response is a 'normal' response.

Here, the response stored in the memory unit corresponding to the time slot 1 (1102) is not a normal response, so the response-invalidation unit 103 checks whether the number of time slots sent for the initial response request command matches the counter value (FIG. 10: S304 NO->S306).

Here, the number of time slots is '1', so the slot-number-increase unit 603 increases the number of time slots set for the initial response request command 1112 that is sent in the second ID process 1108 (FIG. 10: S306 YES->S704). Here, it is assumed that the number of time slots is set to '4'.

Next, after the initial response request command 1112 has been sent, each of the contactless IC cards 410 to 440 selects one time slot from the four time slots that are set. Here, it is assumed, for example, that contactless IC cards 410, 430 select the time slot 2 (1110), the contactless IC card 420 select the time slot 1(1109), and the contactless IC card 440 select the time slot 3 (1111).

In this case, the response-detection unit 102 detects the response 1114 from the contactless IC card 420 by the response at the time slot 1 (1109), detects the 'collision' of the response 1113 from the contactless IC card 410 and the response 1115 from the contactless IC card 430 by the response at the time slot 2 (1110), and detects the response 1116 from the contactless IC card 440 by the response at the time slot 3 (1111).

The response-detection unit 102 detects the 'collision', so the response-invalidation unit 103 repeats the process steps S303 to S366 shown in FIG. 10, and sends the response-invalidation command 1117 for contactless IC card 420 and the response-invalidation command 1118 for the contactless IC card 440.

By doing this, the contactless IC card 420 and the contactless IC card 440 shift to the active period and do not respond to any future initial response request command.

Next, the counter N is compared with the number of time slots, and when processing for each time slot is finished, the slot-number-increase unit 603 performs the increase process for increasing the number of time slots for the third ID process (FIG. 10: S306 YES->S704).

Here, the slot-number-increase unit 603 can increase the number of time slots, however, when the slot-number-increase unit 603 receives notification that the response-invalidation process has been performed by the response-invalidation unit 103, the slot-number increase unit 603 does not increase the number of time slots.

By determining whether to increase the number of time slots based on whether or not the response-invalidation process has been executed, as described above, it is possible to avoid unnecessarily increasing the number of time slots, and thus it is possible to prevent delays in the ID process due to increasing the number of time slots.

Next, the control unit 105 sends an initial response request command for the third ID process 1201 (FIG. 10: S301). The number of time slots for the initial response request command 1205 is '4'.

In the third ID process 1201, the contactless IC card 410 selects the time slot 2 (1203) and the contactless IC card 430 selects the time slot 4 (1204). The contactless IC cards 420 and 440 have already shifted to the active period by the response-invalidation process, so as described above, they do not respond to the initial response request command.

In the third ID process 1201, the response-detection unit 102 does not detect any 'collisions', and detects 'normal' responses, so the contactless IC cards 410, 430 are identified by the reader/writer 901 using the usual (conventional) processing (FIG. 10: S302->END).

After this, each of the contactless IC cards 410 to 440 perform the specified communication with the reader/writer 901, and communication ends, for example, by a 'HALT' command or the like.

In the future (next) ID process 1208, the ID process is repeated again from process S701, so the number of time slots set for the initial response request command becomes '1'.

Also, by the 'HALT' command at the end of communication, the contactless IC cards 420 and 440, for which responding was invalidated, can now again respond to an initial response request command (active period ends).

By performing the invalidation process as described above each time for IC cards having no collisions, the ID process is performed only for IC cards having collisions, and also, by properly increasing the number of time slots, it is possible to perform identification smoothly and efficiently according to the number of IC cards in a system where it is necessary to identify a plurality of IC cards.

Similar to the first and second embodiments, it is possible to apply the invention to a reader/writer that uses contact-type IC cards instead of the contactless IC cards. Also, the invention can be applied to a reader/writer that uses a slot-marker method instead of the time slot method, or it is even possible to apply the invention to a reader/writer that uses another slot method.

Moreover, the increase of the number of time slots can be a fixed value or can be a variable value.

Furthermore, in the case of a reader/writer for which it is predicted from the start that there will be communication with a plurality of IC cards, the number of time slots for the first initial response request command does not necessarily need to be set to '1', and can be set to a number of time slots corresponding to the reader/writer.

(Embodiment 4)

Next, the reader/writer 1301 of a fourth embodiment of the invention will be explained with reference to FIG. 13 to FIG. 15.

Figure 13:
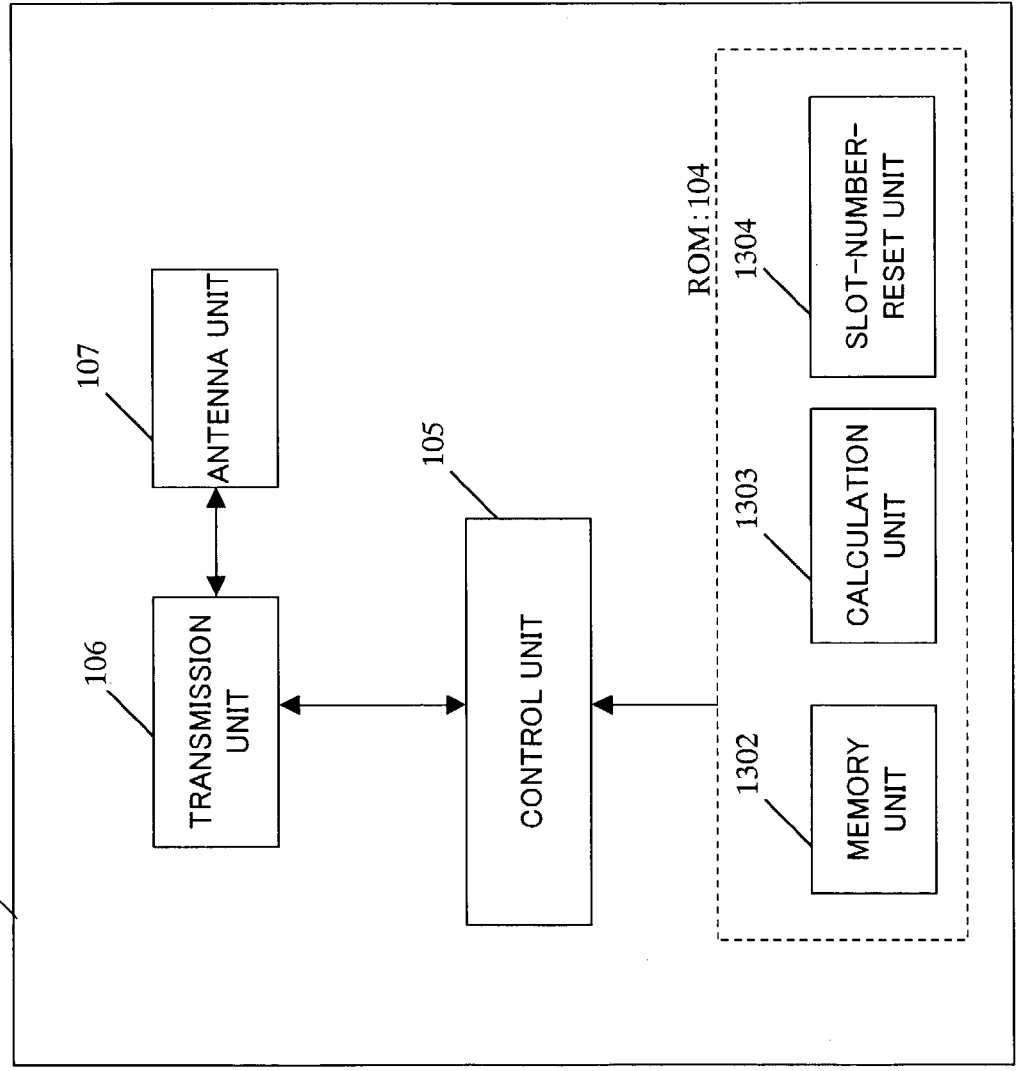
FIG. 13 is a functional block diagram of a reader/writer in a fourth embodiment.
Figure 14:
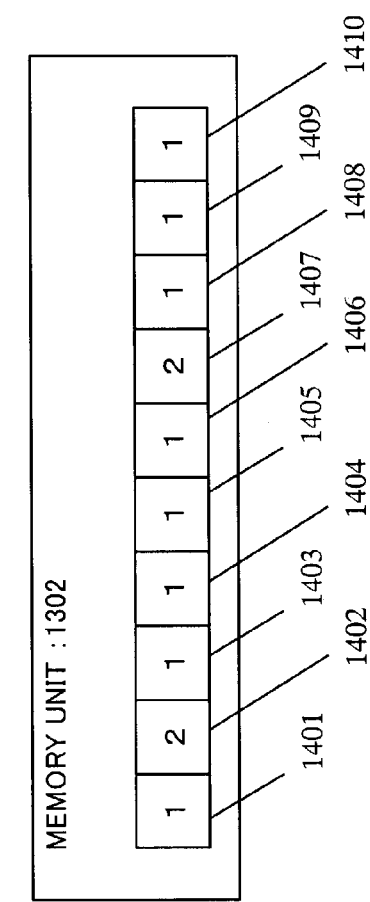
FIG. 14 is a drawing showing an image of data stored by a memory unit.
Figure 14:
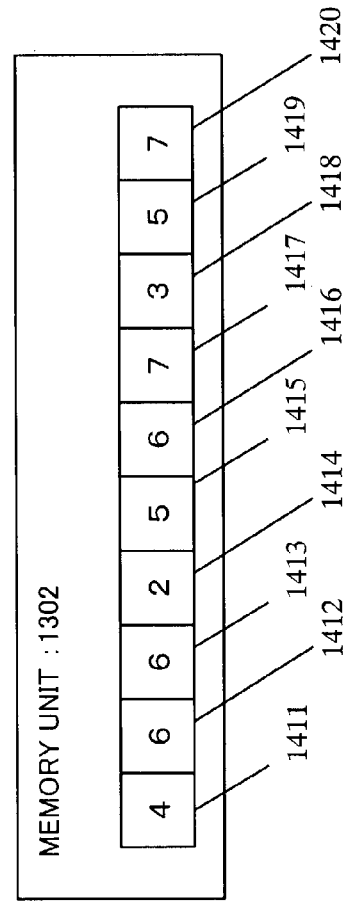
Figure 14:
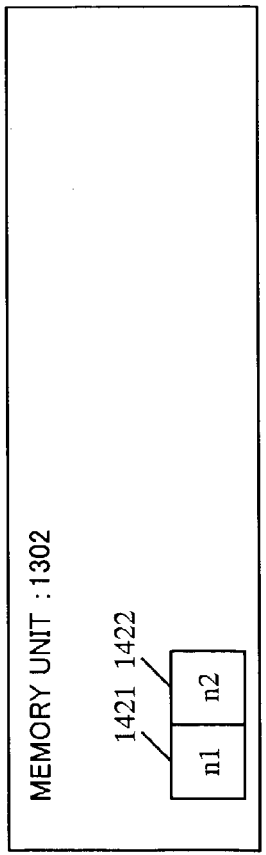

The reader/writer 1301 shown in FIG. 13 has the same construction as the reader/writer 101 of the first embodiment, however, instead of the response-detection unit 102 and the response-invalidation unit 103, it comprises a memory unit 1302, a calculation unit 1303 and a slot-number-reset unit 1304. Each unit will be explained in detail below. Also, FIG. 14 is a drawing showing an image of the data stored by the memory unit 1302, and FIG. 15 is a flowchart of the processes executed by the reader/writer 1301 of this fourth embodiment.

This embodiment is the same as that described for the first to third embodiments in that a plurality of contactless IC cards are confirmed by having the control unit 105 send an initial response request command to each of the plurality of contactless IC cards.

Here, when confirmation ends normally, the memory unit 1302 stores the number of properly confirmed contactless IC cards. For example, as shown in FIG. 14A, there are ten memory areas in the memory unit 1302, and the number of confirmed IC cards are stored in order in the memory areas 1401 to 1410 beginning with the newest confirmation. In this way, it is possible to store the number of the ten most recently confirmed contactless IC cards.

Next, after storage in the memory unit 1302 is completed, the calculation unit 1303 calculates the number of time slots for the next initial response request command to be sent based on the number of contactless IC cards stored in the ten memory areas. Here, any method can be used as the method for calculating the number of slots as long as it calculates the average value of the number of IC cards for the past ten times. In this case, the fractions can be round-up or round-off. In the example shown in FIG. 14A, the average value of the number (number of IC cards) stored in each of the memory areas is '1.2', so the number of time slots for the initial response request command becomes '1' (round-off was adapted to). On the other hand, FIG. 14B shows an example for the case when the use of the contactless IC cards becomes more popular and the number of contactless IC cards that a person carries in their wallet or purse increases. In this case, the number of IC cards confirmed once increases, and the average of the number (number of IC cards) stored in each memory area 1411 to 1420 shown in FIG. 14B is '5.1' so the number of time slots for the initial response request command becomes '5' (round-off was adapted to).

The slot-number-reset unit 1304 is notified of the number of time slots calculated by the calculation unit 1303, and then the slot-number-reset unit 1304 sets the notified value as the number of time slots for the future initial response request command.

After this, the control unit 105 sends an initial response request command using the value reset by the slot-number-reset unit 1304 ('5' in the case shown in FIG. 14B). On the contactless IC card side, when the number of time slots is re-calculated using the value included in the initial response request command, '3' is stored for the initial response request command so that the value calculated on the contactless IC card side will be '5' or more.

As was described above, by dynamically changing the number of time slots based on the log of confirmed contactless IC cards, it is possible to reduce the ID processing time for each card with high probability. Also, even as the number of contactless IC cards carried by a single user increases over time, the initial value of the number of time slots changes automatically, so as a result, it becomes possible to extend the years of service that a system using a reader/writer can be used.

Next, a different calculation method for calculating the number of time slots by the calculation unit 1303 will be explained using FIG. 15.

In the explanation below, the calculation unit 1303 pays attention to continuousness of numbers of confirmed cards and changes the initial value based on the continuousness.

Figure 15:
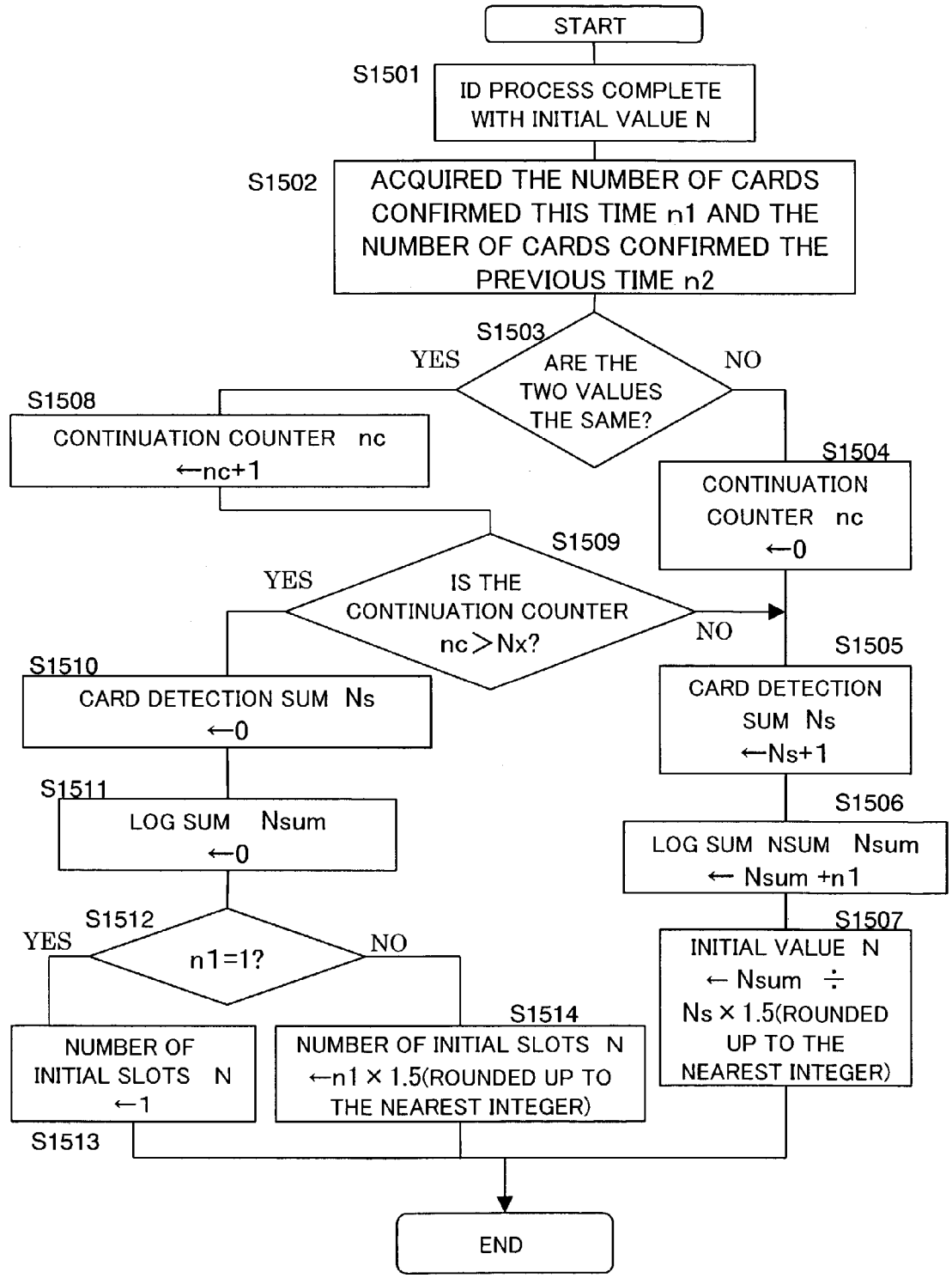
FIG. 15 is a flowchart of the processes executed by a reader/writer in a fourth embodiment.
Figure 16:
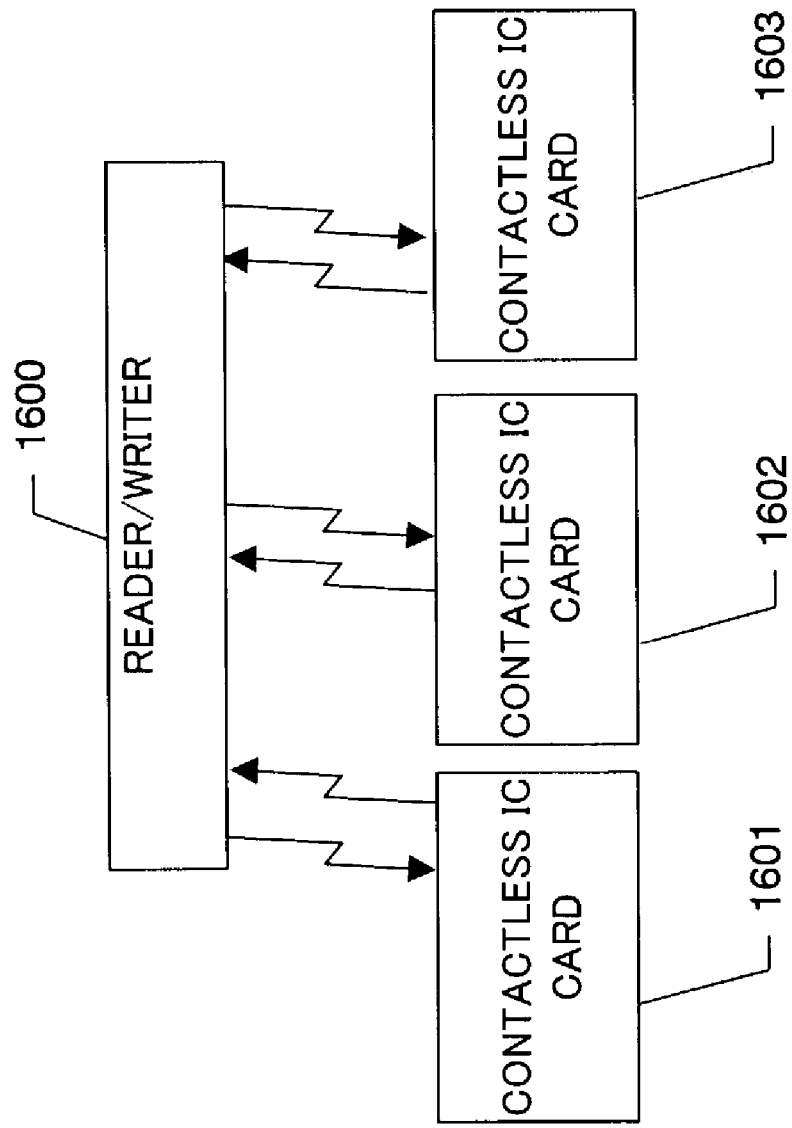
FIG. 16 is a drawing showing an image of communication between a prior reader/writer and contactless IC cards.
Figure 17:
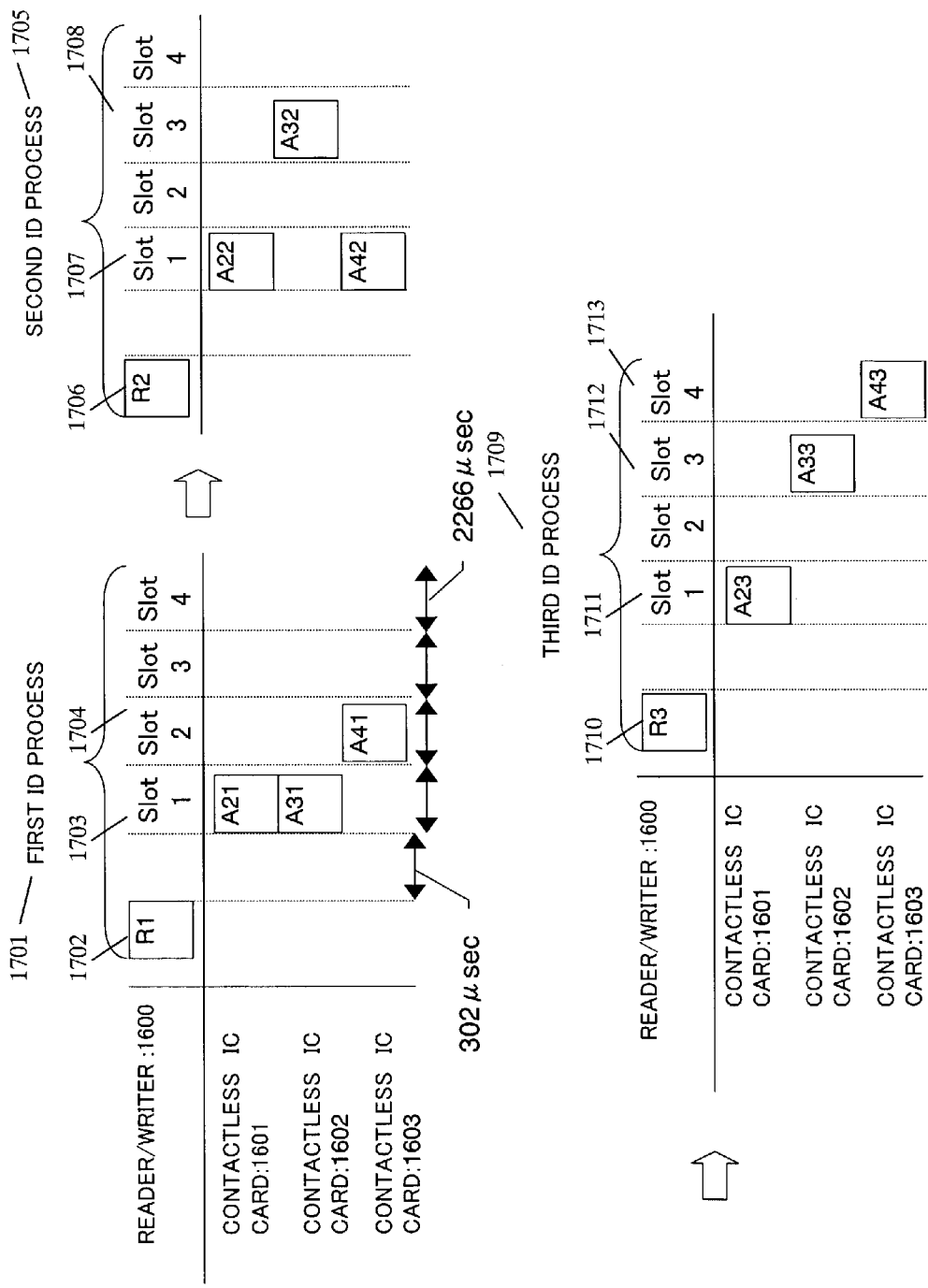
FIG. 17 is a drawing showing an image of a prior ID process.

First, the control unit 105 completes the ID process using N as the initial value (number of time slots) included in the initial response request command (FIG. 15: S150). After that, the memory unit 1302 stores the confirmed number n1 in the memory area 1421, and copies the number of cards confirmed in the previous processing that was stored in memory area 1421 in memory area 1422 as the number of cards n2.

Next, the calculation unit 1303 acquires the number of cards n1 and n2 from the memory unit 1302, and compares whether the two numbers are the same or not (FIG. 15: S1502->S1503).

Here, when n1 and n2 are not the same, the continuation counter nc is set to '0' (FIG. 15: S1503 NO->S1504). Here, the continuation counter nc is a value that indicates how many times the same number of cards was confirmed.

Also, the calculation unit 1303 adds '1' to the card detection sum Ns, and adds n1 to the log sum Nsum (FIG. 15: S1505->S1506). Here, the card detection sum Ns indicates the number of times up until the present time that the reader/writer was able to properly complete the contactless IC card ID process, and the log sum Nsum indicates the number of contactless IC cards that have been confirmed up until the present time by the reader/writer.

Next, the calculation unit 1303 substitutes the initial value N with the value calculated by 'Nsum/Ns×1.5' (FIG. 15: S1507). Here, 'Nsum/Ns' (decimal values are round-up) is the average number of cards confirmed in one ID process. By multiplying 'Nsum/Ns' by '1.5', an initial value that is greater than the number of cards is calculated, however, it is possible to uses another value other than '1.5'.

The initial value N calculated by the calculation unit 1303 is sent to the slot-number-reset unit 1304, and the slot-number-reset unit 1304 sets that value as the initial value. The initial value N is used by the control unit 105 in the next initial response request command (ID process).

When n1 and n2 are the same in the comparison process S1503, the continuation counter nc is increased by an increment of '1' and a threshold value Nx is compared with the continuation counter Nc (FIG. 15: S1503 YES->S1508->S1509).

Here, when the continuation counter nc<=Nx, the initial value N is set by the process S1505 to S1507 (FIG. 15: S1509 NO->S1505 to S1507).

On the other hand, when the continuation counter nc, nc>Nx, the card detection sum Ns is reset to '0', and the log sum Nsum is also reset to '0' (FIG. 15: S1509 YES->S1510->S1511). Then, the calculation unit 1303 determines whether n1 is '1' (FIG. 15: S1512).

Here, when n1 is '1', the initial value N is taken to be '1', and the control unit 105 uses that initial value N in the following initial response request command (ID process). (FIG. 15: S1512 YES->S1513).

However, when n1 is not '1', the initial value N is substituted with the value calculated by 'n1×1.5' (decimal part values are round-up), and the control unit 105 uses that initial value N in the following initial response request command (ID process) (FIG. 15: S1512 NO->S1514). Here, the value '1.5' is a value used for calculating an initial value that is larger than the number of cards, however, it is possible to use a value other than '1.5'.

It is also possible to use the threshold value (Nx) to determine the number of times the same number of cards are confirmed, and then calculate the initial value based on that continuation sum. In the above process, when the number of confirmed cards is '1', the process of multiplying by '1.5' and round-up is not performed. This is because when the number of cards is '1', the ID process will end the most quickly when the initial value is '1'.

The memory unit, calculation unit and slot-number-reset unit of this fourth embodiment can be added to embodiments 1 to 3. By performing all simultaneously, it is possible to reduce the ID processing time even more.

(Effect of the Invention)

As described above, when a normal response is received even though a collision is detected, a response-invalidation command is sent to the IC cards having a normal response, so the following ID process is performed only for the IC cards having responses caused collisions. In other words, the probability that there will be collisions in the next ID process is reduced, and thus it is possible to complete the ID process more quickly.

Moreover, by detecting only whether or not there are collisions of responses from the IC cards and increasing the number of time slots based only on whether or not there are collisions, it is possible to efficiently perform the ID process according to the number of IC cards without having to add complex construction to the reader/writer.

Furthermore, by performing a response-invalidation process each time for the IC cards that do not have collisions, performing the ID process only for IC cards having collisions and properly increasing the number of time slots, it is possible to smoothly and efficiently perform the ID process according to the number of IC cards even for systems in which it is necessary to identify a plurality of IC cards.

Also, by dynamically changing the number of time slots based on a log of previously confirmed non-IC cards, it is possible to reduce the ID processing time for each card. At the same time, it is possible to extend the years of service of a system using a reader/writer.

What is claimed is:

1. A reader/writer for IC cards that communicates with a plurality of IC cards using time slots, comprising:
   a response-detection unit operable to detect normal responses from the IC cards, in response to an initial request for identifying each card, and collisions of the responses;
   a response-invalidation unit operable to send a response-invalidation command, which is a command not to respond to a future initial request, to the IC cards that sent normal responses when the response-detection unit received normal responses from the IC cards even though collisions were detected;
   a calculation unit operable to calculate a number of the time slots to be included in the future initial request for identifying each IC card based on whether or not the response-invalidation unit sent the response-invalidation command; and
   a slot-number-reset unit operable to set the number of time slots calculated by the calculation unit as the number of time slots for the future initial request.

2. The reader/writer according to claim 1, further comprising a slot-number-increase unit operable to increase the number of the time slots based on whether or not the response-invalidation unit sent the response-invalidation command.

3. The reader/writer according to claim 1, wherein the response-invalidation command is an 'ATTRIB' command or 'HALT' command according to the ISO/IEC (International Organization For Standardization/International Electrotechnical Commission) standard 14443.

4. The reader/writer according to claim 1, further comprising a unit operable to decrease the number of the time slots based on whether or not the response-invalidation unit sends the response-invalidation command.

5. An ID method of identifying a plurality of IC cards for communication using time slots, comprising:
   a detection step of detecting normal responses from the IC cards, in response to an initial request for identifying each IC card, and collisions of the responses;
   a response-invalidation step of sending a response-invalidation command, which is a command not to respond to a future initial request, to the IC cards that sent normal responses when the normal responses were received from the IC cards even though collisions were detected;
   a calculation step of calculating a number of the time slots to be included in the future initial request for identifying each IC card based on whether or not the response-invalidation command is sent in the response-invalidation step; and
   a slot-number-reset step of setting the number of time slots calculated in the calculation step as the number of time slots for the future initial request.

6. A program that is executed by a computer for identifying a plurality of IC cards for communication using time slots, comprising:
   a detection step of detecting normal responses from the IC cards, in response to an initial request for identifying each IC card, and collisions of the responses;
   a response-invalidation step of sending a response-invalidation command, which is a command not to respond to a future initial request, to the IC cards that sent normal responses when the normal responses were received from the IC cards even though collisions were detected;
   a calculation step of calculating a number of the time slots to be included in the future initial request for identifying each IC card based on whether or not the response-invalidation command is sent in the response-invalidation step; and
   a slot-number-reset step of setting the number of time slots calculated in the calculation step as the number of time slots for the future initial request.

7. A computer readable medium, bearing a program for identifying a plurality of IC cards for communication using time slots, the program, when executed, causing a computer to perform the steps of:

a detection step of detecting normal responses from the IC cards, in response to an initial request for identifying each IC card, and collisions of the responses;

a response-invalidation step of sending a response-invalidation command, which is a command not to respond to a future initial request, to the IC cards that sent normal responses when the normal responses were received from the IC cards even though collisions were detected;

a calculation step of calculating a number of the time slots to be included in the future initial request for identifying each IC card based on whether or not the response-invalidation command is sent in the response-invalidation step; and a slot-number-reset step of setting the number of time slots calculated in the calculation step as the number of time slots for the future initial request.

* * * * *